US008096883B2

(12) United States Patent
Frattinger et al.

(10) Patent No.: US 8,096,883 B2
(45) Date of Patent: Jan. 17, 2012

(54) SYSTEM AND METHOD FOR DELIVERING WAGER GAMING MACHINE INFORMATION

(75) Inventors: Christopher J. Frattinger, Sparks, NV (US); Robert T. Davis, Reno, NV (US); Terry D. Warkentin, Carson City, NV (US)

(73) Assignee: WMS Gaming Inc., Waukegan, IL (US)

( * ) Notice: Subject to any disclaimer, the term of this patent is extended or adjusted under 35 U.S.C. 154(b) by 1015 days.

(21) Appl. No.: 11/279,953

(22) Filed: Apr. 17, 2006

(65) Prior Publication Data

US 2006/0281544 A1 Dec. 14, 2006

Related U.S. Application Data

(60) Provisional application No. 60/672,274, filed on Apr. 18, 2005.

(51) Int. Cl.
*A63F 13/00* (2006.01)

(52) U.S. Cl. .......................................................... 463/42

(58) Field of Classification Search ............... 463/40–42
See application file for complete search history.

(56) References Cited

U.S. PATENT DOCUMENTS

| | | | | |
|---|---|---|---|---|
| 6,652,378 | B2 * | 11/2003 | Cannon et al. | 463/20 |
| 6,830,515 | B2 * | 12/2004 | Rowe | 463/42 |
| 6,860,810 | B2 * | 3/2005 | Cannon et al. | 463/20 |
| 7,455,590 | B2 * | 11/2008 | Hansen et al. | 463/40 |
| 2003/0069071 | A1 * | 4/2003 | Britt et al. | 463/42 |
| 2004/0087367 | A1 * | 5/2004 | Hendrickson | 463/42 |
| 2004/0180721 | A1 * | 9/2004 | Rowe | 463/42 |
| 2005/0148393 | A1 * | 7/2005 | Crumby | 463/42 |

* cited by examiner

*Primary Examiner* — Masud Ahmed
(74) *Attorney, Agent, or Firm* — Schwegman, Lundberg & Woessner, P.A.

(57) ABSTRACT

Systems and methods for delivering wager gaming machine information are described herein. In one embodiment, the method includes collecting information about a wager gaming machine. The method can also include creating a human-readable wager gaming machine information report based on the information and e-mailing the wager gaming machine report to an email address.

10 Claims, 9 Drawing Sheets

802

REPORT 1

| (1) Type of Slot Machines | (2) Number of Machines | (3) Percent ofTotal Units | (4) Win Percent | (5) Annual win perMachine | (6) Total WinAmount | (7) PercentTotal Win | (8) PercentIncrease Over Last year |
|---|---|---|---|---|---|---|---|
| 5¢ | 50 | 41.70% | 18.50% | $5,210 | $260,500 | 21.30% | 13.50% |
| 10¢ | 17 | 14.2 | 22 | 6,990 | 118,830 | 9.7 | 25.9 |
| 25¢ | 28 | 23.3 | 19.7 | 10,100 | 282,800 | 23.1 | 18.6 |
| 50¢ | 5 | 4.2 | 20.4 | 7,880 | 39,400 | 3.2 | 55.7 |
| $1 | 20 | 16.6 | 5.8 | 26,190 | 523,800 | 42.7 | 53.7 |
| | 120 | 100.00% | | | $1,225,330 | 100.00% | |

REPORT 2

804

| Type of Slot Machines | Number of Machines | Equivalent Play Amount | Percent ofTotal (Supply) |
|---|---|---|---|
| 5¢ | 50 | $46,250 | 11.90% |
| 10¢ | 17 | 37,400 | 9.6 |
| 25¢ | 28 | 137,900 | 35.1 |
| 50¢ | 5 | 51,000 | 13.1 |
| $1 | 20 | 116,000 | 29.9 |
| | | 388,550 | 1 |

REPORT 3

806

| Type of Slot Machines | Number of Machines | Total Win Amount | Contribution to Total Win (Demand) |
|---|---|---|---|
| 5¢ | 50 | $260,500 | 21.30% |
| 10¢ | 17 | 118,830 | 9.7 |
| 25¢ | 28 | 282.8 | 23.1 |
| 50¢ | 5 | 39,400 | 3.2 |
| $1 | 20 | 523.8 | 42.7 |
| | | $1,225,330 | 100.00% |

FIG. 8

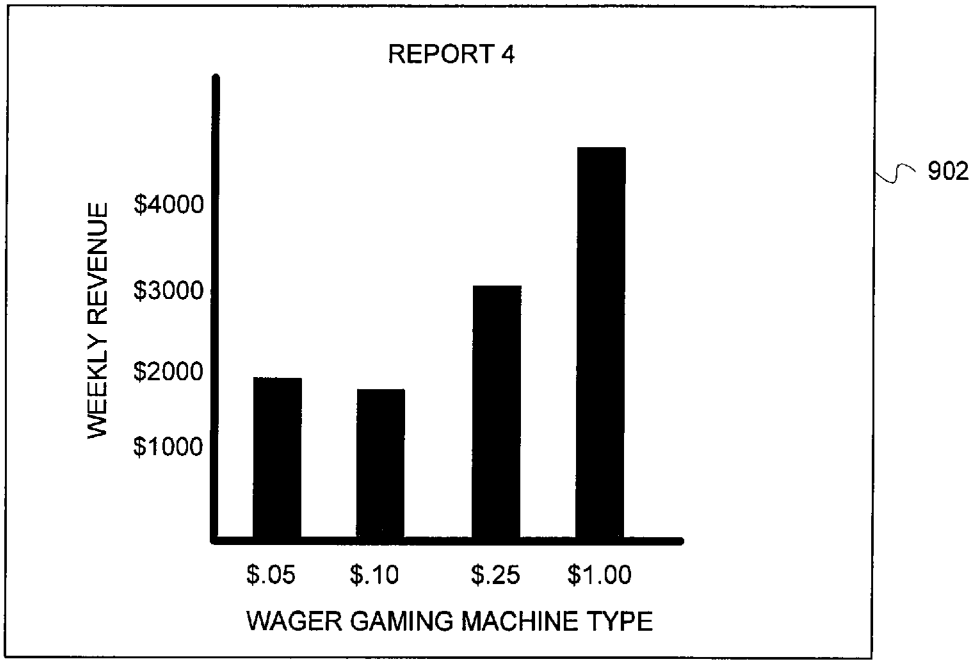
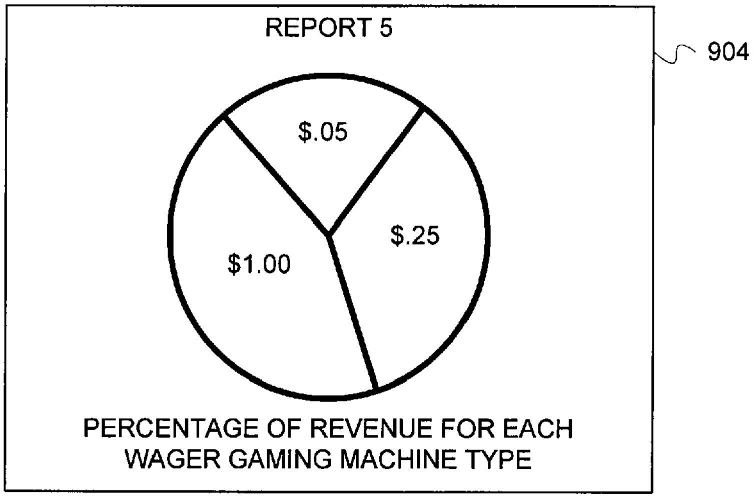
FIG. 9

SYSTEM AND METHOD FOR DELIVERING WAGER GAMING MACHINE INFORMATION

RELATED APPLICATION

This application claims priority under 35 U.S.C. 119(e) from U.S. Provisional Application Ser. No. 60/672,274 filed Apr. 18, 2005, which application is incorporated herein by reference.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever. Copyright 2006, WMS Gaming, Inc.

FIELD

This invention relates generally to the field of wager gaming machine data processing and more particularly to the field of wager gaming machine mix report delivery.

BACKGROUND

Casino managers and others often track and analyze how wager gaming machine mix factors such as floor placement, wager gaming machine type, and gaming content affect casino revenue. For example, by tracking wager gaming machine floor placement, casino managers can determine what wager gaming machines generate higher revenues when placed in close proximity to casino entrances and what machines yield higher revenues when placed at other floor locations. Similarly, by tracking wager gaming machine type and gaming content, casino managers can determine whether $0.05 wager gaming machines produce more revenue than $1.00 wager gaming machines and whether bonus event content increases revenues.

In order to maximize revenues, casino managers may periodically collect and analyze wager gaming machine mix information (e.g., wager gaming machine type, content, and floor placement) for each wager gaming machine on a casino floor. Collecting mix information can be a complicated process in which system administrators procure revenue information from various wager gaming machine databases and wager gaming machine analysts create reports for presenting the wager gaming machine mix information. Analysts or other casino workers typically hand-deliver the wager gaming machine mix reports to casino managers. Because this process typically involves several casino workers, there can be long delays between the time wager gaming machine mix information is collected and when mix reports are delivered to casino managers.

BRIEF DESCRIPTION OF THE FIGURES

The present invention is illustrated by way of example and not limitation in the Figures of the accompanying drawings in which:

FIG. 8 shows text-based human-readable wager gaming machine reports, according to example embodiments of the invention; and FIG. 9 shows graphics-based human-readable wager gaming machine reports, according to example embodiments of the invention.

DESCRIPTION OF THE EMBODIMENTS

Systems and methods for delivering wager gaming machine information are described herein. This description of the embodiments is divided into five sections. The first section provides an introduction to embodiments of the invention, while the second section describes an example operating environment and system architecture. The third section describes example operations and the fourth section describes example gaming information reports. The fifth section provides some general comments.

Introduction

This section introduces embodiments of a system for delivering wager gaming machine information.

Figure 1:
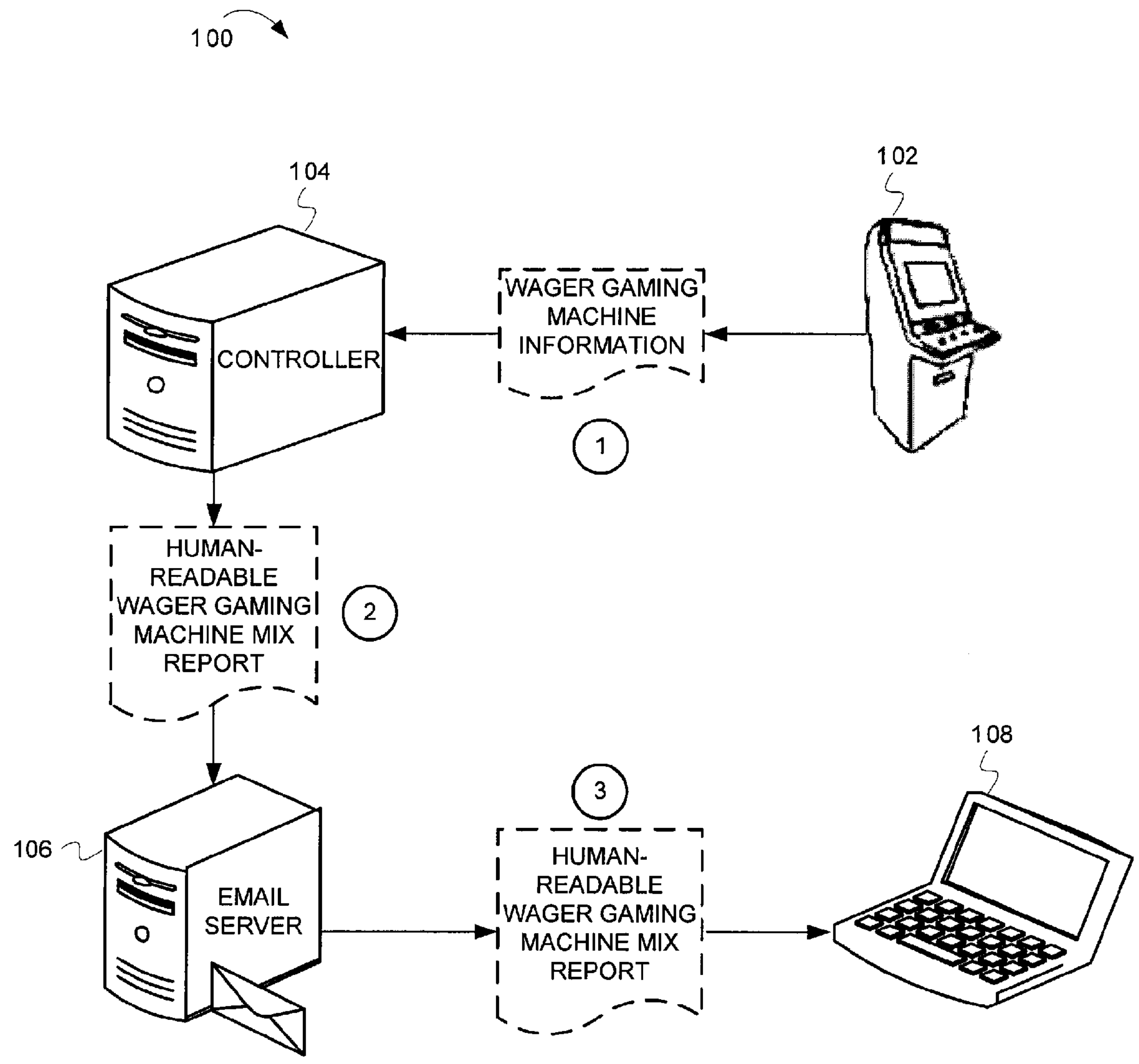
FIG. 1 is a dataflow diagram illustrating dataflow for electronically delivering a wager gaming machine information report.

FIG. 1 is a dataflow diagram illustrating dataflow for electronically delivering a wager gaming machine information report. In FIG. 1, the dataflow occurs in a system 100 which includes a wager gaming machine 102, controller 104, e-mail server 106, and reporting console 108. The system 100 automates the process by which casino managers and others receive wager gaming machine information reports. The dataflow of FIG. 1 occurs in three stages.

At stage 1, the controller 104 receives wager gaming machine information (e.g., information about the number of games played, money collected, etc.) from a wager gaming machine 102.

At stage 2, the controller 104 creates a human-readable wager gaming machine information report based on the wager gaming machine information. The controller also transmits the wager gaming machine information report to the e-mail server 106, which stores the wager gaming machine information report in an e-mail account associated with a report recipient, such as a casino manager, manufacturer employee, wager gaming machine operator, or other person who may want to receive the report.

At stage 3, the e-mail server 106 transmits the wager gaming machine report to the reporting console 108, which presents the human-readable wager gaming machine information report to the report recipient. The report recipient can make decisions about the casino's wager gaming machine mix (i.e., the type, number, gaming content, floor placement, etc. of the casino's wager gaming machines) based on the human-readable wager gaming machine report. Because the system 100 delivers human-readable wager gaming machine information reports via email, casino managers and others can receive the reports without delays associated with hand delivery. As a result, casino managers and others can make wager gaming machine mix decisions based on fresh wager gaming machine information.

Hardware, Operating Environment, and System Architecture

This section provides an example system architecture with which embodiments of the invention can be practiced. This section also describes an example computer system and wager gaming machine. Operations of the system components will be described in the next section.

Example System Architecture

Figure 2:
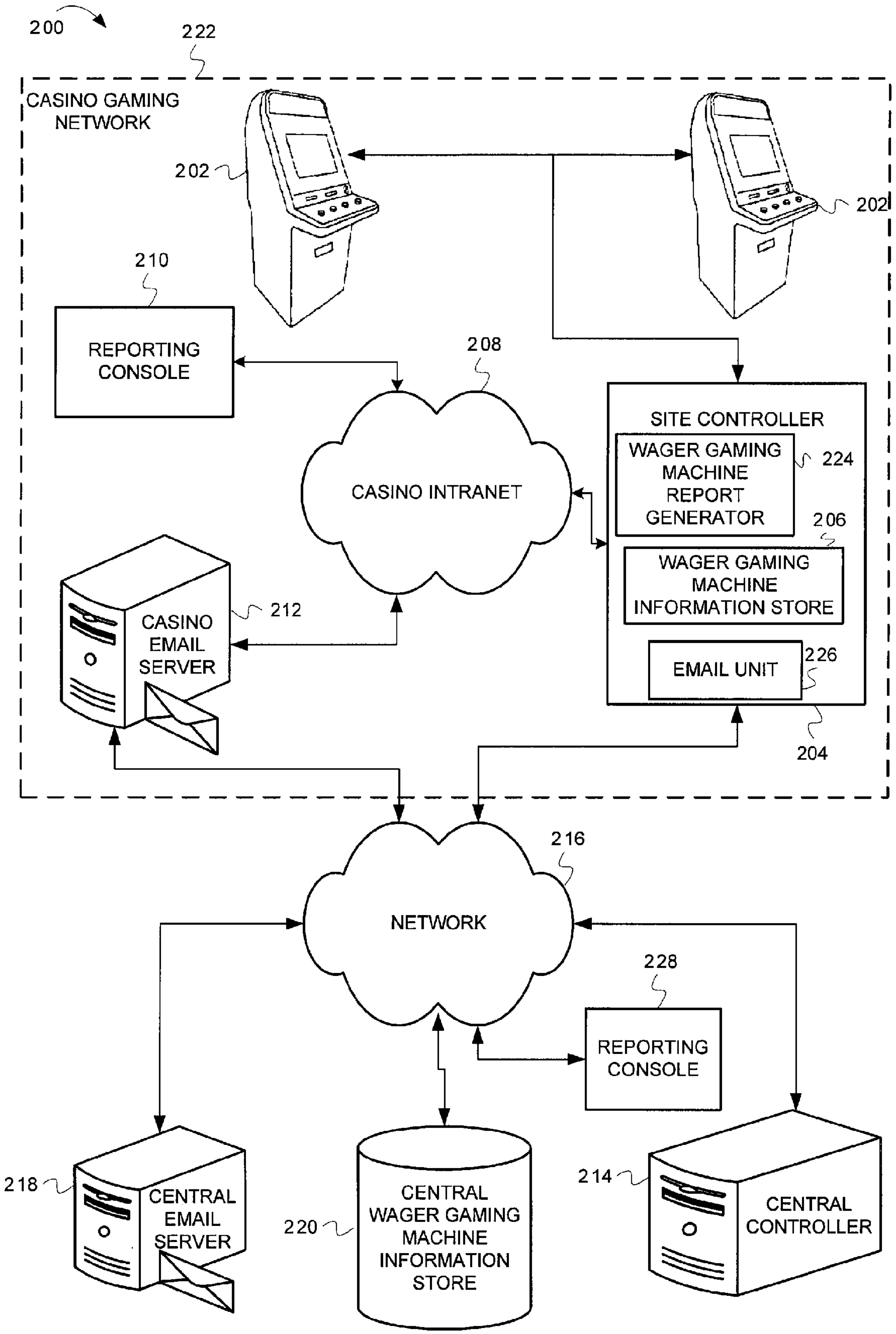
FIG. 2 is a block diagram illustrating a system for electronically delivering wager gaming machine reports, according to example embodiments of the invention.

FIG. 2 is a block diagram illustrating a system for electronically delivering wager gaming machine reports, according to example embodiments of the invention. As shown in FIG. 2, the system 200 includes wager gaming machines 202 connected to a site controller 204. The site controller 204, which includes a wager gaming machine data store 206, wager gaming machine report generator 224 and email unit 226, is connected to a casino intranet 208. The casino intranet 208 is connected to a reporting console 210 and a casino e-mail server 212. The wager gaming machines 202, site controller 204, casino network 208, reporting console 210, and casino e-mail server 212 comprise a casino gaming network 222.

The casino e-mail server 212 and site controller 204 are also connected to a network 216, which is connected to a central e-mail server 218, central wager gaming machine information store 220, reporting console 228 and central controller 214. Although not shown in FIG. 2, the central controller 214 includes a wager gaming machine report generator 224 and email unit 226.

The wager gaming machines 202 can be any casino-style wager gaming machines for conducting casino-style games, such as slots, blackjack, roulette, keno, poker, etc. In one embodiment, the wager gaming machines 202 can be any computing device capable of conducting a wagering game. For example, the wager gaming machines 202 can be desktop computers, laptop computers, personal digital assistants.

The site controller 204 can receive wager gaming machine information from the wager gaming machines 202. The wager gaming machine information can include any information associated with wager gaming machines, such as number of games played, coins collected, and dollars collected. The wager gaming machine information can also include floor position information, wager gaming machine class information, wager gaming machine type information, and game content information. Wager gaming machine class information can indicate whether a machine includes mechanical indicia (e.g., reels), video indicia, or both, while wager gaming machine type information includes data indicating what monetary amounts the machine allows (e.g., $0.05, $0.25, $1.00, etc.). Game content information can indicate what games and/or bonus events reside on a wager gaming machine. In one embodiment, the wager gaming machine information can include operational information about the wager gaming machines. For example, the wager gaming machine information can include information about the wager gaming machines' CPU utilization, downtime/uptime, power consumption, peripheral devices, malfunctions, software performance, memory usage or any other operational parameter.

The site controller's report generator 224 can create human-readable wager gaming machine information reports based on the wager gaming machine information. The email unit 226 can transmit the human-readable wager gaming machine information reports to the casino email server 212. The casino e-mail server 212 can transmit the human-readable wager gaming machine information reports inside and outside the casino gaming network 222, while the reporting console 210 can present the reports.

In one embodiment, although not shown in FIG. 2, the network 216 can be connected to more than one casino gaming network 222. As a result, the central wager gaming machine data store 220 can store wager gaming machine information received from wager gaming machines of various casino gaming networks. Additionally, the central e-mail server 218 can exchange e-mail with a plurality of casino e-mail servers 212.

Figure 3:
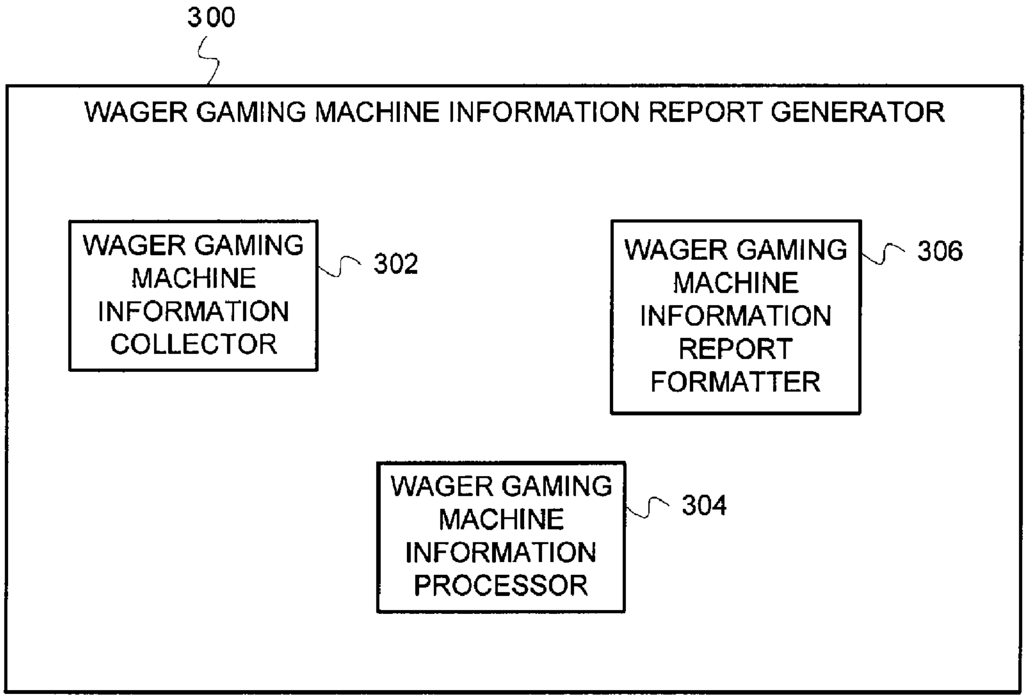
FIG. 3 is a block diagram illustrating components of a wager gaming machine report generator, according to example embodiments of invention.

FIG. 3 is a block diagram illustrating components of a wager gaming machine report generator, according to example embodiments of invention. As shown in FIG. 3, the wager gaming machine report generator 300 includes a wager gaming machine information collector 302, wager gaming machine information processor 304, and wager gaming machine report formatter 306.

The wager gaming machine information collector 302 collects wager gaming machine information from the wager gaming machines 202 (see FIG. 2). In one embodiment, the wager gaming machine information collector 302 can request wager gaming machine information from the wager gaming machines 202. In another embodiment, the wager gaming machines 202 can periodically push wager gaming machine information to the wager gaming machine information collector 302.

The wager gaming machine information processor 304 processes the wager gaming machine information using any suitable algorithm for tracking and/or manipulating wager gaming machine revenues. For example, the wager gaming machine information processor 304 can determine from the gaming information which wager gaming machines 202 are generating higher or lower than expected revenues. The wager gaming machine information processor 304 can process the wager gaming machine information using mathematical and statistical techniques.

The wager gaming machine information report formatter 306 creates human-readable wager gaming machine reports based on results produced by the wager gaming machine information processor 304.

Example Computer System and Wager Gaming Machine

Figure 4:
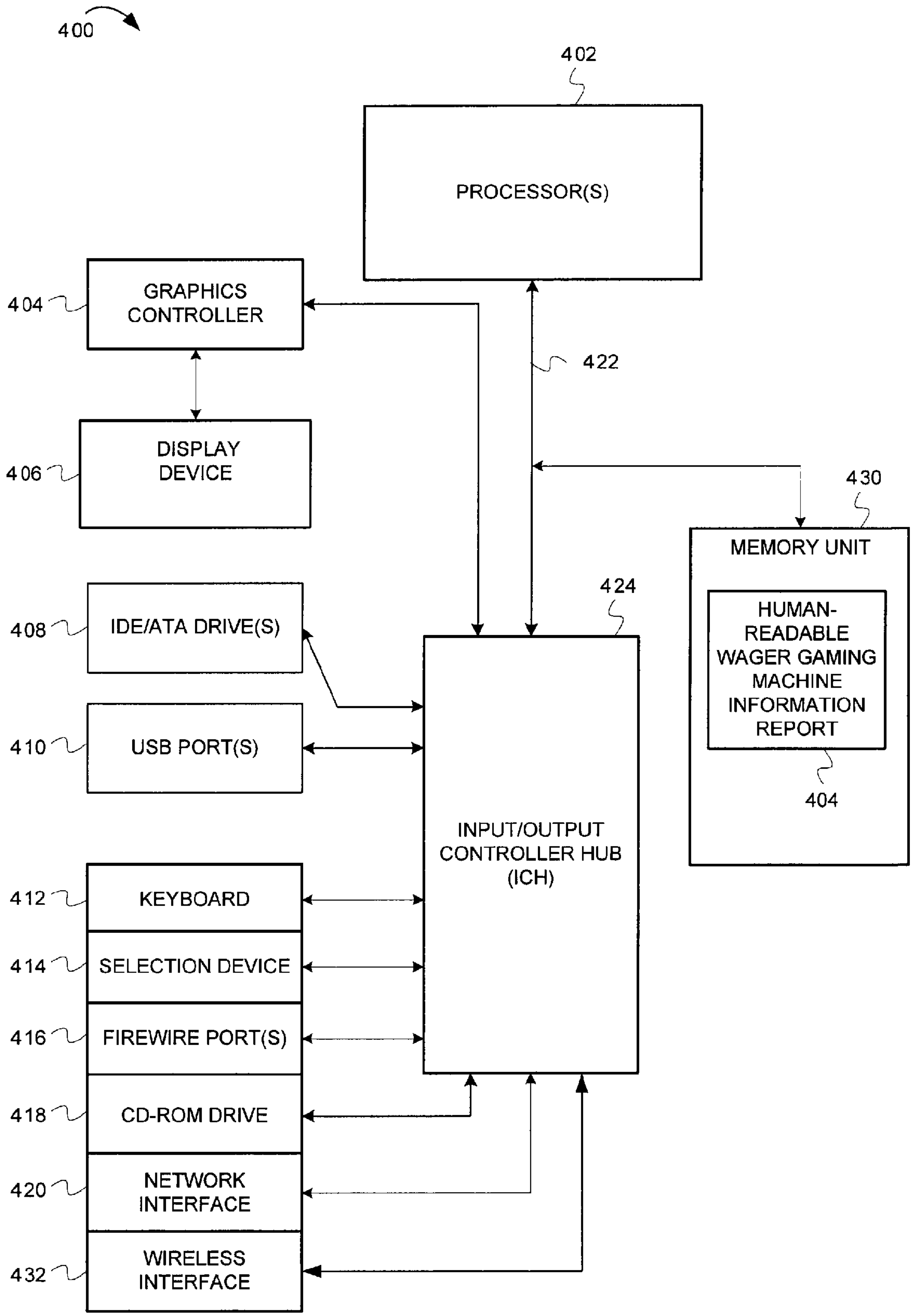
FIG. 4 illustrates an example computer system used in conjunction with certain embodiments of the invention.

FIG. 4 illustrates an example computer system used in conjunction with certain embodiments of the invention. For example, the computer system 400 can be employed in the email servers, site controllers, and wager gaming machines shown in FIG. 2.

As illustrated in FIG. 4, the computer system 400 comprises processor(s) 402. The computer system 400 also includes a memory unit 430, processor bus 422, and Input/Output controller hub (ICH) 424. The processor(s) 402, memory unit 430, and ICH 424 are coupled to the processor bus 422. The processor(s) 402 may comprise any suitable processor architecture. The computer system 400 may comprise one, two, three, or more processors, any of which may execute a set of instructions in accordance with embodiments of the invention.

The memory unit 430 includes a human-readable gaming information report 404. The memory unit 430 can also store data and/or instructions, and may comprise any suitable memory, such as a dynamic random access memory (DRAM). The computer system 400 also includes IDE drive(s) 408 and/or other suitable storage devices. A graphics controller 404 controls the display of information on a display device 406, according to embodiments of the invention.

The input/output controller hub (ICH) 424 provides an interface to I/O devices or peripheral components for the computer system 400. The ICH 424 may comprise any suitable interface controller to provide for any suitable communication link to the processor(s) 402, memory unit 430 and/or to any suitable device or component in communication with the ICH 424. For one embodiment of the invention, the ICH 424 provides suitable arbitration and buffering for each interface.

For one embodiment of the invention, the ICH 424 provides an interface to one or more suitable integrated drive electronics (IDE) drives 408, such as a hard disk drive (HDD) or compact disc read only memory (CD ROM) drive, or to suitable universal serial bus (USB) devices through one or more USB ports 410. For one embodiment, the ICH 424 also provides an interface to a keyboard 412, selection device 414, CD-ROM drive 418, or other suitable devices through one or more firewire ports 416. In one embodiment, the ICH 424 also provides a network interface 420 though which the computer system 400 can communicate with other computers and/or devices. The ICH 424 can be connected to a wireless interface, which enables the computer system 400 to wirelessly connect to computing devices using any suitable wireless communication protocol (e.g., 802.11b, 802.11g, etc.).

In one embodiment, the computer system 400 can be employed as a site controller 204, casino email server 212, central email server 218, or offsite controller 214. In one embodiment, the computer system 400 includes a machine-readable medium that stores a set of instructions (e.g., software) embodying any one, or all, of the methodologies for e-mailing human-readable wager gaming machine reports described herein. Furthermore, software can reside, completely or at least partially, within memory unit 430 and/or within the processor(s) 402.

Figure 5:
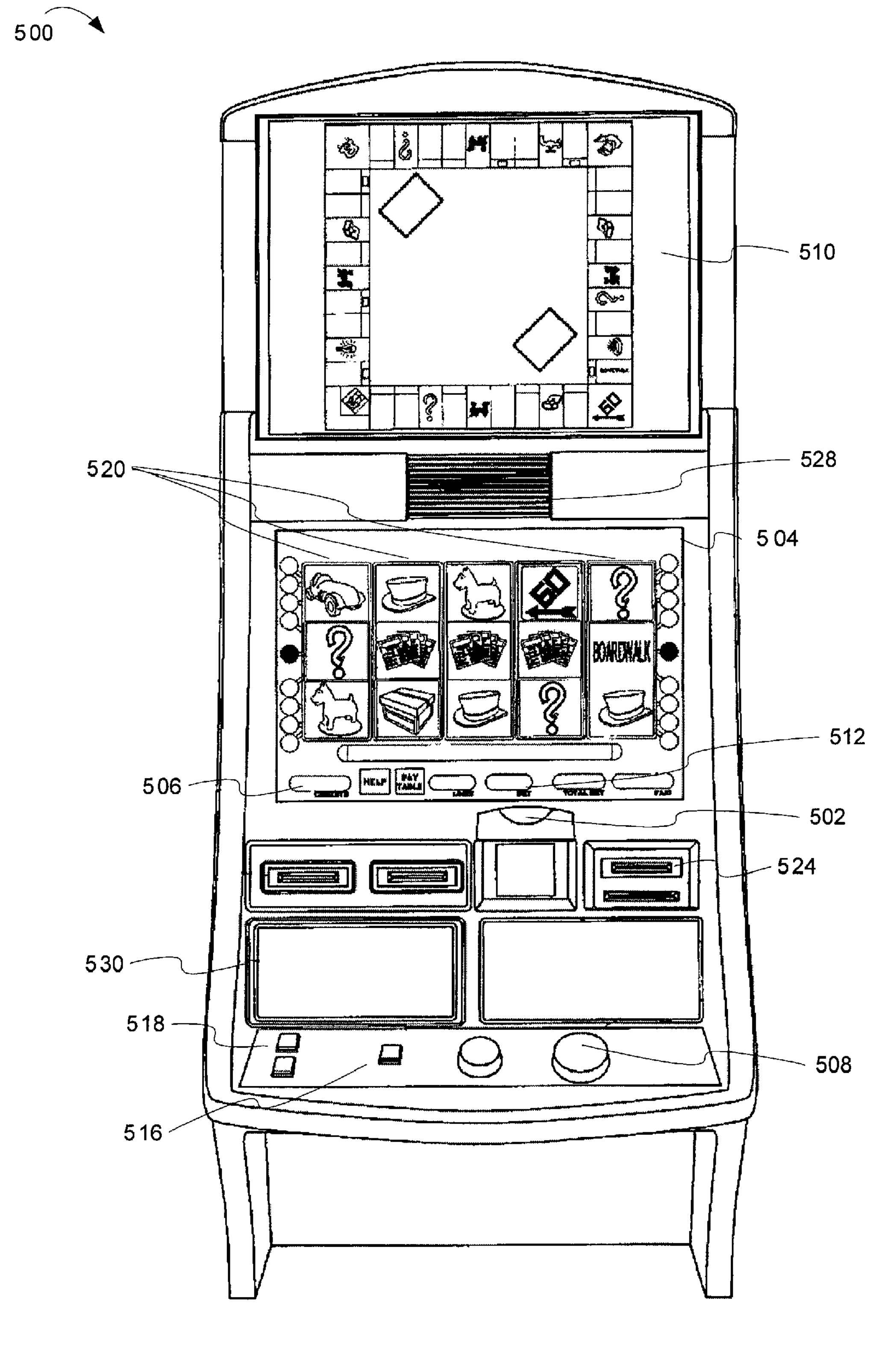
FIG. 5 is a perspective view of a wager gaming machine, according to example embodiments of the invention.

While FIG. 4 describes a computer system that can be employed in some embodiments of the invention, FIG. 5 describes wager gaming machines in greater detail.

FIG. 5 is a perspective view of a wager gaming machine, according to example embodiments of the invention. As shown in FIG. 5, the wager gaming machine 500 can be a computerized wager gaming machine having the controls, displays, and features of a conventional wager gaming machine.

The wager gaming machine 500 can be operated while players are standing or seated. Additionally, the wager gaming machine 500 is preferably mounted on a stand (not shown). However, it should be appreciated that the wager gaming machine 500 can be constructed as a pub-style table-top game (not shown), which a player can operate while sitting. Furthermore, the wager gaming machine 500 can be constructed with varying cabinet and display designs. The wager gaming machine 500 can incorporate any primary game such as slots, poker, or keno, and additional bonus round games. The symbols and indicia used on and in the wager gaming machine 500 can take mechanical, electrical, or video form.

As illustrated in FIG. 5, the wager gaming machine 500 includes a coin slot 502 and bill acceptor 524. Players can place coins in the coin slot 502 and paper money or ticket vouchers in the bill acceptor 524. Other devices can be used for accepting payment. For example, credit/debit card readers/validators can be used for accepting payment. Additionally, the wager gaming machine 500 can perform electronic funds transfers and financial transfers to procure monies from financial accounts. When a player inserts money in the wager gaming machine 500, a number of credits corresponding to the amount deposited are shown in a credit display 506. After depositing the appropriate amount of money, a player can begin playing the game by pushing play button 508. The play button 508 can be any play activator used for starting a wagering game or sequence of events in the wager gaming machine 500.

As shown in FIG. 5, the wager gaming machine 500 also includes a bet display 512 and a "bet" button 516. The player places a bet by pushing the bet button 516. In one embodiment, the player can increase the bet by one credit each time the player pushes the bet button 516. In another embodiment, the player can increase the bet by two, three, or more credits each time the player pushes the bet button 516. When the player pushes the bet one button 516, the number of credits shown in the credit display 506 decreases by one credit, while the number of credits shown in the bet display 512 increases by one credit.

A player may "cash out" by pressing a cash out button 518. When a player cashes out, the wager gaming machine 500 dispenses a voucher or currency corresponding to the number of remaining credits. The wager gaming machine 500 may employ other payout mechanisms such as credit slips (which are redeemable by a cashier) or electronically recordable cards (which track player credits), or electronic funds transfer.

The wager gaming machine also includes a primary display unit 504 and a secondary display unit 510 (also known as a "top box"). The wager gaming machine may also include an auxiliary video display. In one embodiment, the primary display unit 504 displays a plurality of video reels 520. According to embodiments of the invention, the display units 504 and 510 can include any visual representation or exhibition, including moving physical objects (e.g., mechanical reels and wheels), dynamic lighting, and video images. In one embodiment, each reel 520 includes a plurality of symbols such as bells, hearts, fruits, numbers, letters, bars or other images, which correspond to a theme associated with the wager gaming machine 500. Furthermore, as shown in FIG. 5, the wager gaming machine 500 includes an audio presentation unit 528. The audio presentation unit 528 can include audio speakers or other suitable sound projection devices.

In one embodiment, one or more wager gaming machines 500 can be part of a system in which human-readable wager gaming machine reports are emailed to one or more report recipients.

System Operations

This section describes operations performed by embodiments of the invention. In certain embodiments, the operations are performed by instructions residing on machine-readable media (e.g., software), while in other embodiments, the operations are performed by hardware or other logic (e.g., digital logic).

In this section, FIGS. 6 and 7 will be discussed. In particular, FIGS. 6 and 7 describe operations for creating and e-mailing human-readable wager gaming machine reports. This description will proceed with a discussion of FIG. 6.

Figure 6:
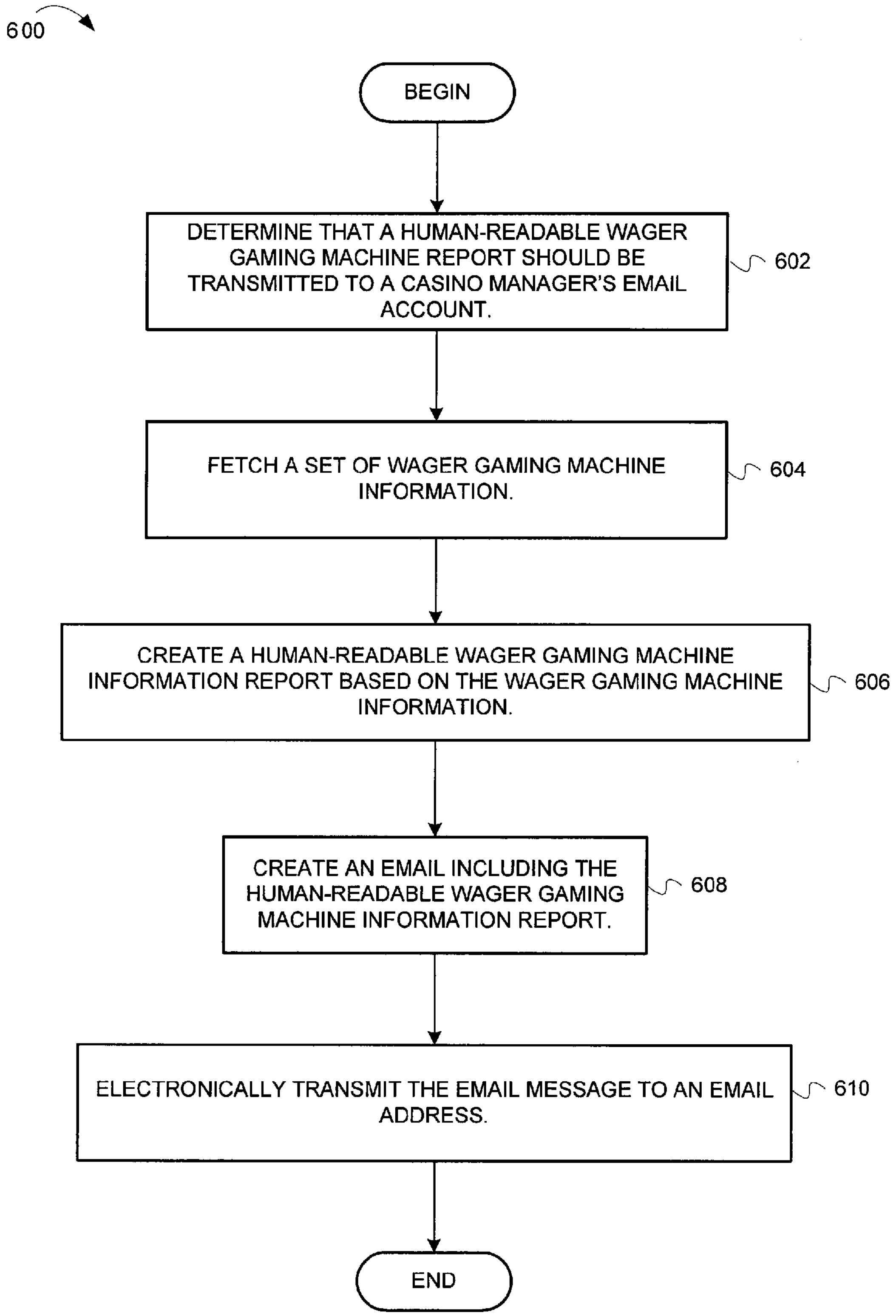
FIG. 6 is a flow diagram illustrating operations for e-mailing human-readable wager gaming machine reports, according to example embodiments of the invention.

FIG. 6 is a flow diagram illustrating operations for e-mailing human-readable wager gaming machine reports, according to example embodiments of the invention. The flow diagram 600 will be described with reference to the example embodiments shown in FIGS. 2 and 3. The flow diagram 600 commences at block 602.

At block 602, a determination is made that a human-readable wager gaming machine information report should be transmitted to an e-mail account. For example, the site controller 204 or the central controller 214 determines that a human-readable wager gaming machine information report should be transmitted to an e-mail account. In one embodiment, the site controller 204 or central controller 214 can make this determination periodically or in response to a request from another component of the system 200 (e.g., a command from the administrator console 210). The flow continues at block 604.

At block 604, a set of wager gaming machine information is fetched. In one embodiment, the site controller's or central controller's wager gaming machine information collector 302 fetches wager gaming machine information from a wager gaming machine 202 or from the wager gaming machine information store 206. In another embodiment, the central controller's wager gaming machine information collector 302 fetches wager gaming machine information from the central wager gaming machine information store 220. The flow continues at block 606.

At block 606, based on the wager gaming machine information, a human-readable wager gaming machine information report is created. For example, the site controller's or central controller's wager gaming machine information processor 304 processes the wager gaming machine information and produces performance information about the wager gaming machines 202. After the wager gaming machine information is processed, the wager gaming machine information report formatter 306 formats the performance information into a human-readable wager gaming machine information report. Wager gaming machine information reports are discussed in more detail below. The flow continues at block 608.

At block 608, an e-mail message including the human-readable gaming information report is created. For example, the site controller's or central controller's email client 226 creates an e-mail message including the human-readable gaming information report. In one embodiment, the report is added to the email message as an attachment. In another embodiment, the report is included in the body of the email. In another embodiment, the report is not included in an e-mail message. Instead, a reference (e.g. a link or URL) to the report is included in the e-mail message. The flow continues at block 610.

At block 610, the email message is electronically transmitted to an email address. For example, the site controller's or central controller's email unit 226 electronically transmits the email message, which includes the human-readable wager gaming machine information report, to an email address serviced by the casino email server 212 and/or central email server 218. In one embodiment, the email unit 226 transmits the email message using simple mail transfer protocol (SMTP). In one embodiment, the email address is associated with a report recipient, such as a casino manager, manufacturer employee, wager gaming machine operator, or other person who may want to receive the report. From block 610, the flow ends.

Figure 7:
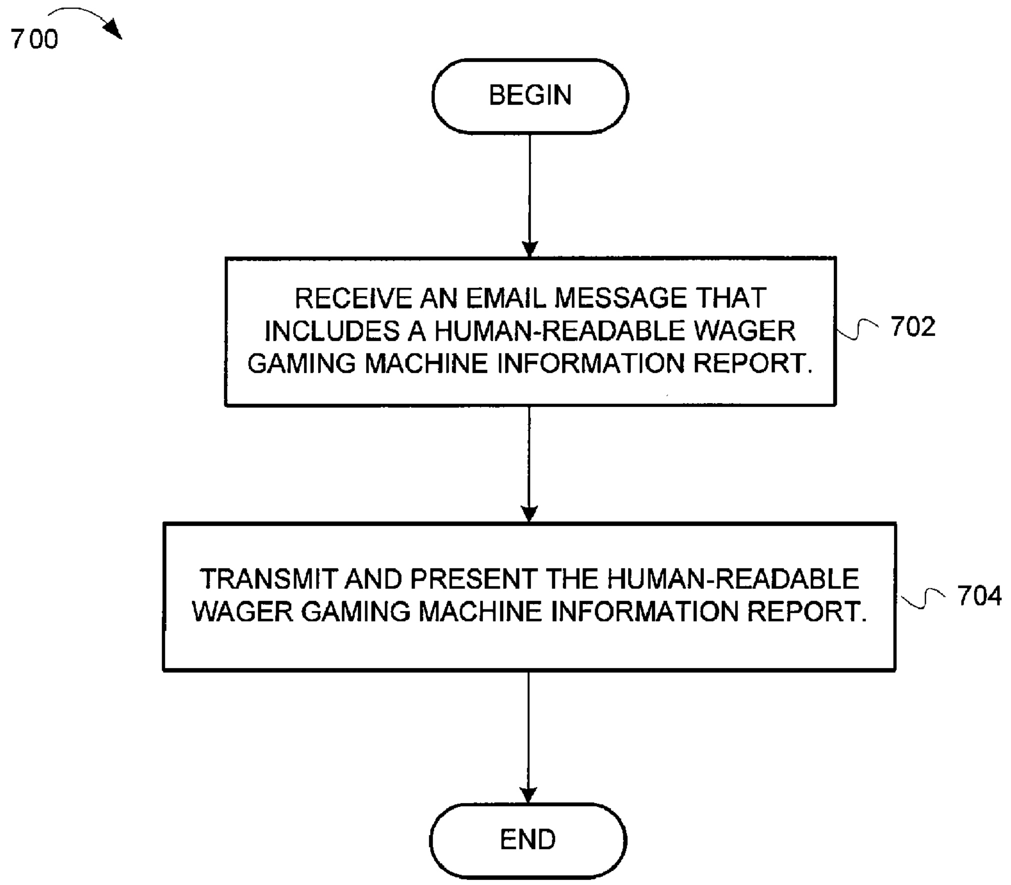
FIG. 7 is a flow diagram illustrating operations for receiving and presenting a human-readable wager gaming machine information report, according to example embodiments of the invention.

While FIG. 6 describes operations for creating and e-mailing a human-readable wager gaming machine report, FIG. 7 describes operations for receiving and presenting the report.

FIG. 7 is a flow diagram illustrating operations for receiving and presenting a human-readable wager gaming machine information report, according to example embodiments of the invention. The flow diagram 700 will be described with reference to the example system shown in FIG. 2. The flow diagram 700 commences at block 702.

At block 702, an email message including a human-readable wager gaming machine information report is received. In one embodiment, the casino email server 212 or the central email server 218 receives an email message including a human-readable wager gaming machine information report. The flow continues at block 704.

At block 704, the email message including the report is transmitted and the report is presented. For example, the casino email server 212 or the central email server 218 transmits the email message including the report to a reporting console 210. The reporting console 210 presents the human-readable wager gaming machine information report to a casino manager. From block 704, the flow ends.

The next section describes human-readable wager gaming machine information reports, according to example embodiments of the invention.

Wager Gaming Machine Information Reports

This section describes some example human-readable wager gaming machine information reports. Although several reports are discussed below, embodiments of the invention call for any suitable human-readable wager gaming machine report format.

FIG. 8 shows text-based human-readable wager gaming machine reports, according to example embodiments of the invention. As shown in FIG. 8, reports 1-4 present raw wager gaming machine information as human-readable formatted text. The reports enable casino managers to make wager gaming machine mix decisions at a glance.

Reports 1-4 each present different wager gaming machine information. As shown in FIG. 8, report 1 (802) includes columns for presenting: 1) type of wager gaming machine; 2) number of machines; 3) percentage of total units; 4) win percentage; 5) annual win per machine; 6) total win amount; 7) percent of total win; and 8) percent increase over last year.

Report 2 (804) includes columns for presenting 1) type of wager gaming machine; 2) number of machines; 3) total win amount; and 4) contribution to total win (demand).

Report 3 (806) includes columns for presenting 1) type of wager gaming machine; 2) number of machines; 3) equivalent play amount; and 4) percent of total (supply).

FIG. 9 shows graphics-based human-readable wager gaming machine reports, according to example embodiments of the invention. In FIG. 9, reports 4 and 5 present raw wager gaming machine information as human-readable graphs. As shown in FIG. 9, reports 4 and 5 present gaming information that has been processed by the wager gaming machine information processor 304 and arranged in graphical form by the wager gaming machine information report formatter 306. In one embodiment, the wager gaming machine information report formatter 306 can represent wager gaming machine information in any suitable graphical format. For example, the wager gaming machine report formatter 306 can create reports which include 2-D and 3-D line charts, bar charts, and pie graphs. Additionally, the wager gaming machine report formatter 306 can create reports that include non-chart graphics (e.g., casino floor diagrams).

Report 4 (902) includes a bar graph representing weekly revenues for each wager gaming machine type of a given casino. Report 5 (904) includes a pie graph representing a percentage of profit for each wager gaming machine type of a given casino.

The human-readable wager gaming machine information reports described above enable casino managers to quickly understand performance of wager gaming machines on their casino floor. Because embodiments of the system described above automatically create and deliver human-readable reports via email, casino managers can avoid delays associated with hand-creating and hand-delivering the reports.

General Comments

In this description, numerous specific details are set forth. However, it is understood that embodiments of the invention may be practiced without these specific details. In other instances, well-known circuits, structures and techniques have not been shown in detail in order not to obscure the understanding of this description. Note that in this description, references to "one embodiment" or "an embodiment" means that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Each claim, as may be amended, constitutes an embodiment of the invention, incorporated by reference into the detailed description. Moreover, in this description, the phrase "example embodiment" means that the embodiment being referred to serves as an example or illustration.

Herein, block diagrams illustrate example embodiments of the invention. Also herein, flow diagrams illustrate operations of the example embodiments of the invention. The operations of the flow diagrams are described with reference to the example embodiments shown in the block diagrams. However, it should be understood that the various flow diagram operations could be performed by embodiments other than those referenced in the block diagrams. Furthermore, the block diagrams can perform operations different than those discussed with reference to the flow diagrams. Additionally, some embodiments may not perform all the operations shown in a flow diagram. Moreover, it should be understood that although the flow diagrams depict serial operations, certain embodiments could perform certain of those operations in parallel.

The invention claimed is:

1. A computer-implemented method comprising:

requesting, from a central controller, wager gaming machine information from a plurality of wager gaming machines;

receiving, at the central controller, the wager gaming machine information from the plurality of wager gaming machines;

creating a human-readable wager gaming machine information report based on the information received from the plurality of wager gaming machines; and e-mailing the wager gaming machine information report or a reference to the wager gaming machine information report to an email address, wherein the information report includes financial performance of the plurality of wager gaming machines over a time period and a change in the financial performance over time, and wherein the information report is presented in a graphical format.

2. The computer-implemented method of claim 1, wherein the email address is accessible from a reporting console.

3. The computer-implemented method of claim 1, wherein the creating the wager gaming machine information report further includes performing a statistical analysis of the information.

4. The computer-implemented method of claim 1, wherein the e-mailing includes, creating an email message that includes the wager gaming machine information report; and transmitting the email message to the email address.

5. The computer-implemented method of claim 4, wherein the email message is transmitted to the email address using Simple Mail Transfer Protocol.

6. The computer-implemented method of claim 1, wherein the wager gaming machine information report is emailed as an attachment.

7. The computer-implemented method of claim 1, wherein the wager gaming machine information report is embedded in a message transmitted to the email address.

8. The computer-implemented method of claim 1, wherein the wager gaming machine information includes operational information about the wager gaming machine.

9. The computer-implemented method of claim 1, wherein the wager gaming machine information includes game content information indicating which games are installed on the wager gaming machine.

10. The computer-implemented method of claim 1, wherein the wager gaming machine information includes wager gaming machine class information indicating a type of wager gaming machine, the type of wager gaming machine being one of: a mechanical game, a video game, or a hybrid mechanical and video game.

* * * * *